H. S. HALE.
AUTOMOBILE.
APPLICATION FILED MAR. 11, 1916.
1,229,746.
Patented June 12, 1917.
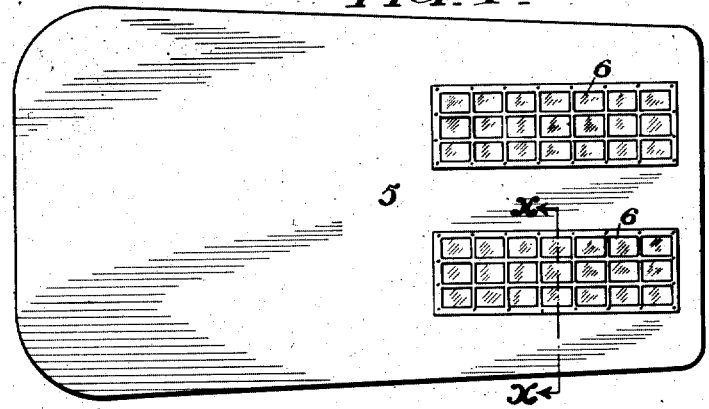
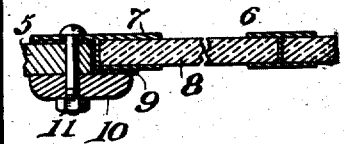
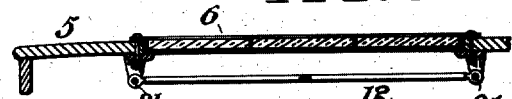
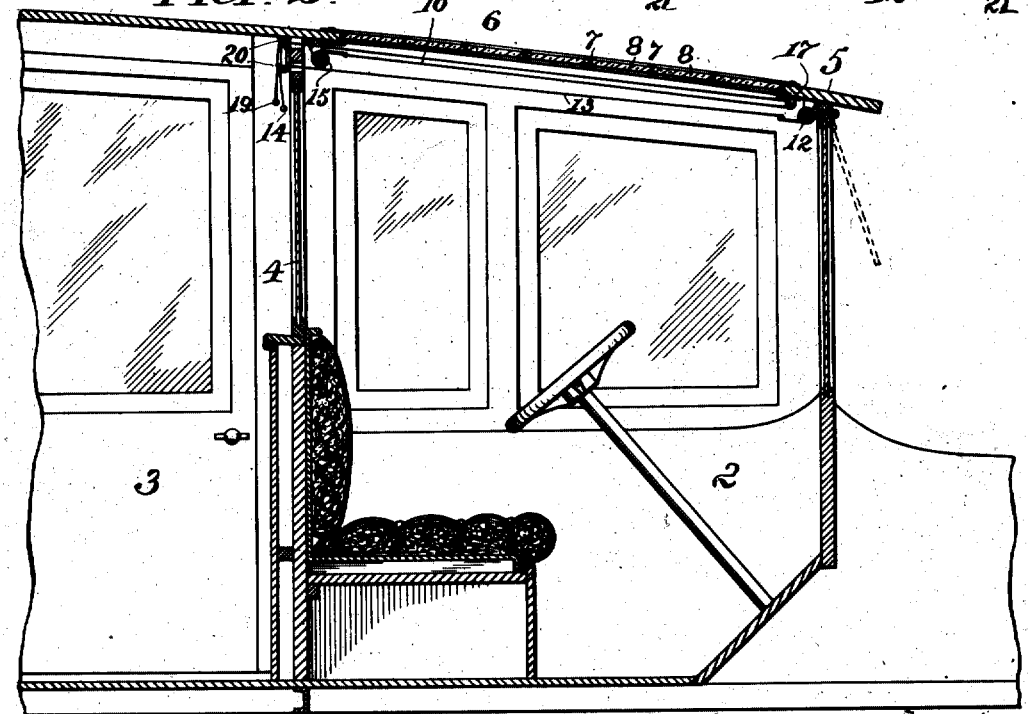
Witnesses
Daniel Webster Jr.
E. W. Smith
Inventor
Henry S. Hale
By
Attorney

UNITED STATES PATENT OFFICE.

HENRY S. HALE, OF PHILADELPHIA, PENNSYLVANIA.

AUTOMOBILE.

1,229,746.  Specification of Letters Patent.  Patented June 12, 1917.

Application filed March 11, 1916. Serial No. 83,485.

*To all whom it may concern:*

Be it known that I, HENRY S. HALE, a citizen of the United States, and resident of Philadelphia, county of Philadelphia and State of Pennsylvania, have invented an Improvement in Automobiles, of which the following is a specification.

The object of my invention is to provide a construction of automobile body of the limousine type to enable the occupants to receive more light and especially in the rear compartment where it is needed, and at the same time to enable the occupants thereof to obtain a better view of scenery located at an elevation above the roadway as when motoring through mountainous regions; and in this connection, my object is to provide windows of suitable construction in the roof over the chauffeur's seat and through which a view may be obtained from the inner compartment of the vehicle.

My object is also to provide capacity for controlling the extent of exposure of the windows in the roof from the inside of the vehicle to shield the same from direct sunlight when such would be objectionable, either from too much glare or from the heat imparted thereby.

My invention consists in providing the roof of a limousine body of an automobile with one or more windows preferably located over the chauffeur's compartment so as to come at such an angle in respect to the rear seat of the vehicle that a forward view may be had through the roof by the occupants sitting in the inner compartment; and also in providing means for controlling the extent of exposure of said windows in the roof, said means being operable from within the vehicle.

My invention also comprehends details of construction which, together with the features above specified, will be better understood by reference to the drawings, in which:—

Figure 1 is a plan view of the roof of a limousine body embodying my invention; Fig. 2 is a longitudinal sectional view through the main portion of the body illustrating my invention; Fig. 3 is a transverse section through a portion of the roof taken on line $x$—$x$ of Fig. 1; and Fig. 4 is a cross section on a larger scale illustrating the suitable manner of attaching the window structure.

2 represents the chauffeur's compartment, and 3 the inner or rear compartment of the limousine body. The usual window 4 between the two compartments may be employed and may be made in any of the well known manners heretofore employed in automobile construction. The general construction of the body is immaterial to my invention, and I do not therefore restrict myself in any respect in this regard. The roof 5 which extends beyond the inner compartment 3 is provided with one or more windows such as indicated at 6. I have preferred in practice to employ two windows of greater length than width and separated at a distance apart, as indicated in Fig. 1. These windows are arranged above the chauffeur's compartment 2, as will be clearly understood by reference to Fig. 2, in which the window is shown of a length slightly less than the length of the said compartment, but the length may be varied without material deviation from the spirit of the invention.

While I do not restrict myself to any particular manner of making the windows, they must be of a character which will impart strength coupled with water-proofness, and the general construction which I have adopted in practice is that illustrated, and comprises a metal frame 7 forming rectangular grooved openings into the grooves of which the glass plates 8 are fastened, the same being embedded in elastic putty, as is well known in the art of glazing. In this manner a tight joint is made, and the window frame as a whole is strong. The upper bounding edge of the frame 7 is provided with a flange, and this rests upon the roof about the opening formed therein for the reception of the window, and the joint between the said window frame and the roof 5 may be made water-tight by a rubber packing 9. As a further support for the window, the under side of the window opening may be bounded with wooden strips 10 between which and the frame the rubber packing 9 is also clamped. Bolts 11 are shown as extending through the flange of the window and through the roof 5 and the supporting strips 10, and clamping parts tightly together so as to make a rigid and water-tight joint. These bolts are arranged all around the windows. The form of the window grating may be greatly varied, and I therefore do not limit myself to a construction of the particular character shown, for each window may be all in one pane of glass or as many panes as desired, or may be in designs such as in stained glass forms, but with clear glass. In fact, broadly considered, the windows may be of any construction and even to the extent of making the entire glass inset like stained glass windows with or without color, though in general usage the windows would have plain glass through which the mountainous scenery may be readily viewed.

Where the sunlight is strong and the glare is too intense, the amount of exposure of the window from the inside may be modified by the employment of curtains 12 and 15, one being arranged at the forward part of the window and the other at the rear portion. These curtains may be of any of the spring roller types. The forward curtain 12 may be drawn backward under the window by means of the cord 13 passing over a pulley 20 and terminating in a pull 14 arranged within the inner compartment 3. In this manner the forward curtain may be drawn backward to any extent desired. Similarly, the rear curtain 15 may be pulled forward by a cord 16 which passes forward over a guide sheave 17, thence backward over a guide wheel 20 and terminates in a pull 19 within the inner compartment 3. By this means the rear curtain may be drawn forward to any desired degree. It is manifest that with these two curtains, the exposure of the window may be as large or small as desired, and the extent of opening may be restricted to any portion of the window so that the occupants of the vehicle may be shielded from the direct rays of the sun. I preferably employ a pair of narrow curtains for each window, so that it is possible to control sunlight through one window without interfering with the other, or vice versa; but it is manifest that if desired, the curtains may be made wider so that one set will answer for the two windows. While the guide wheels 20 may be of the well known character which lock the cords at any position of adjustment, and the spring of the rollers may be sufficiently strong to hold the curtains against sagging, I prefer, however, to guide the free ends of the curtains upon wires such as indicated at 21 in Fig. 3, though this is a minor detail and is only referred to by way of example and not as restriction.

While it is customary for the chauffeur's compartment 2 to be closed, this is not essential, and my invention is equally applicable to that type of limousine in which the chauffeur's compartment is not inclosed, for the overhanging roof without the windows would involve approximately the same difficulties of vision that would occur where the compartment was inclosed, and consequently the invention may be considered as more broadly directed to a forwardly projecting roof beyond the inclosed rear compartment of the body and provided with one or more windows.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. An automobile body having a rear inclosed compartment provided with a vertical glass window at the front wall thereof and said body having an overhanging roof extending forward of the vertical glass window, and said forwardly projecting roof having a substantially horizontal window positioned in advance of the vertical window, whereby an occupant in the inclosed compartment may have a line of vision through the vertical window and the horizontal window upon scenery well in advance of the automobile and also at a greatly higher elevation.

2. An automobile body having a rear inclosed compartment provided with a vertical glass window at the front wall thereof and said body having an overhanging roof extending forward of the vertical glass window, and said forwardly projecting roof having a substantially horizontal window positioned in advance of the vertical window, whereby an occupant in the inclosed compartment may have a line of vision through the vertical window and the horizontal window upon scenery well in advance of the automobile and also at a greatly higher elevation, in combination with horizontally adjustable means arranged on the roof at the under side of the horizontal window for controlling the extent of exposure thereof.

3. An automobile body having a rear inclosed compartment with a glass front and an overhanging forwardly projecting roof, combined with a window arranged in the forwardly projecting portion of the roof, means for controlling the extent of exposure of the said window on the under side comprising two curtains respectively supported at forward and rear ends of the window, and means for adjusting the said curtains in opposite directions.

4. An automobile body having a rear inclosed compartment with a glass front and an overhanging forwardly projecting roof, combined with a window arranged in the forwardly projecting portion of the roof, and means for controlling the extent of exposure of the said window on the under side, said means having devices extending into the rear compartment whereby said exposure may be controlled therefrom.

In testimony of which invention, I hereunto set my hand.

HENRY S. HALE.

Witnesses:
R. M. HUNTER,
FLORENCE DEACON.